United States Patent
Amerine, Sr.

(10) Patent No.: US 9,061,431 B1
(45) Date of Patent: Jun. 23, 2015

(54) PORTABLE CUTTING TOOL, KIT, AND METHODS FOR REMOVING DAMAGED SURFACES

(71) Applicant: The United States of America as Represented by the Secretary of the Navy, Washington, DC (US)

(72) Inventor: Timothy J. Amerine, Sr., Chula Vista, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/758,681

(22) Filed: Feb. 4, 2013

Related U.S. Application Data

(62) Division of application No. 12/542,862, filed on Aug. 18, 2009, now Pat. No. 8,387,495.

(51) Int. Cl.

| | | |
|---|---|---|
| *B26D 5/00* | (2006.01) | |
| *B27B 11/02* | (2006.01) | |
| *B27B 3/00* | (2006.01) | |
| *B27B 5/18* | (2006.01) | |
| *B26D 1/18* | (2006.01) | |
| *B23P 6/00* | (2006.01) | |
| *B21D 47/00* | (2006.01) | |
| *B26D 7/00* | (2006.01) | |

(52) U.S. Cl.
CPC .......................................... *B26D 7/00* (2013.01)

(58) Field of Classification Search
USPC ................ 83/745, 489, 823, 701; 29/402.06, 29/402.11, 897.2, 897.3
See application file for complete search history.

(56) References Cited

U.S. PATENT DOCUMENTS

| | | | | |
|---|---|---|---|---|
| 2,921,492 | A * | 1/1960 | Worth | 83/471.2 |
| 3,203,291 | A * | 8/1965 | Elsas | 83/210 |
| 3,242,548 | A * | 3/1966 | Diller et al. | 425/305.1 |
| 3,281,304 | A * | 10/1966 | Black et al. | 156/351 |
| 3,519,050 | A * | 7/1970 | Dobrinen | 408/37 |
| 4,557,051 | A * | 12/1985 | Jung | 30/273 |
| 5,009,007 | A * | 4/1991 | Martin et al. | 30/92 |
| 5,261,150 | A * | 11/1993 | Grube et al. | 29/560 |
| 5,848,930 | A * | 12/1998 | Jones | 451/237 |
| 6,467,385 | B1 * | 10/2002 | Buttrick et al. | 83/745 |
| 6,536,987 | B2 * | 3/2003 | Chang | 404/25 |
| 6,582,026 | B2 * | 6/2003 | Bertrand | 299/39.3 |
| 6,604,895 | B1 * | 8/2003 | Schroeder | 409/132 |
| 7,112,018 | B2 * | 9/2006 | Boyl-Davis et al. | 409/178 |
| 7,387,475 | B2 * | 6/2008 | Beggs et al. | 408/76 |
| 7,578,642 | B2 * | 8/2009 | Fritsche et al. | 408/76 |
| 7,703,856 | B1 * | 4/2010 | Duncan | 299/39.3 |
| 2006/0053998 | A1 * | 3/2006 | Makkonen et al. | 83/745 |

* cited by examiner

*Primary Examiner* — Ghassem Alie
*Assistant Examiner* — Bharat C Patel
(74) *Attorney, Agent, or Firm* — Charlene A. Haley

(57) ABSTRACT

A cutting tool apparatus, methods, and kit for removing damaged surfaces, more specifically, a portable cutting tool for removing cracked inner wing spars from hard to access surfaces. The portable cutting tool assembly includes at least one cutting tool, at least one alignment cutting mechanism, at least one cutting mechanism, angle plate assembly, and at least one fastening means, where fastening means secures the angle plate assembly to an aircraft wing, and where at least one cutting tool cuts a desired shape from an aircraft wing.

8 Claims, 13 Drawing Sheets

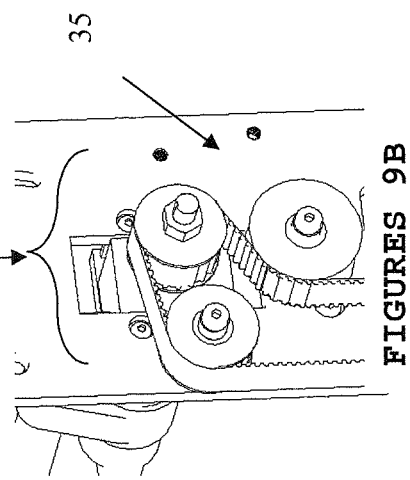
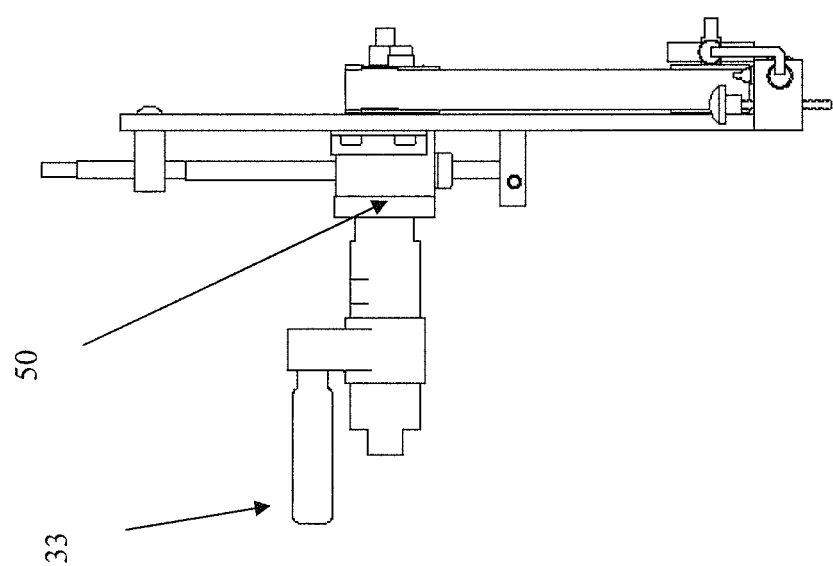
FIGURES 9A
FIGURES 9B

PORTABLE CUTTING TOOL, KIT, AND METHODS FOR REMOVING DAMAGED SURFACES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to cutting tool apparatuses, methods, and kits for removed damaged surfaces, more specifically, a portable cutting tool for removing cracked or damaged areas from hard to access surfaces.

BRIEF DESCRIPTION OF THE DRAWINGS

FIGS. 9A and B are perspective views illustrating the drive shaft assembly, according to embodiments of the invention.

Figure 1:
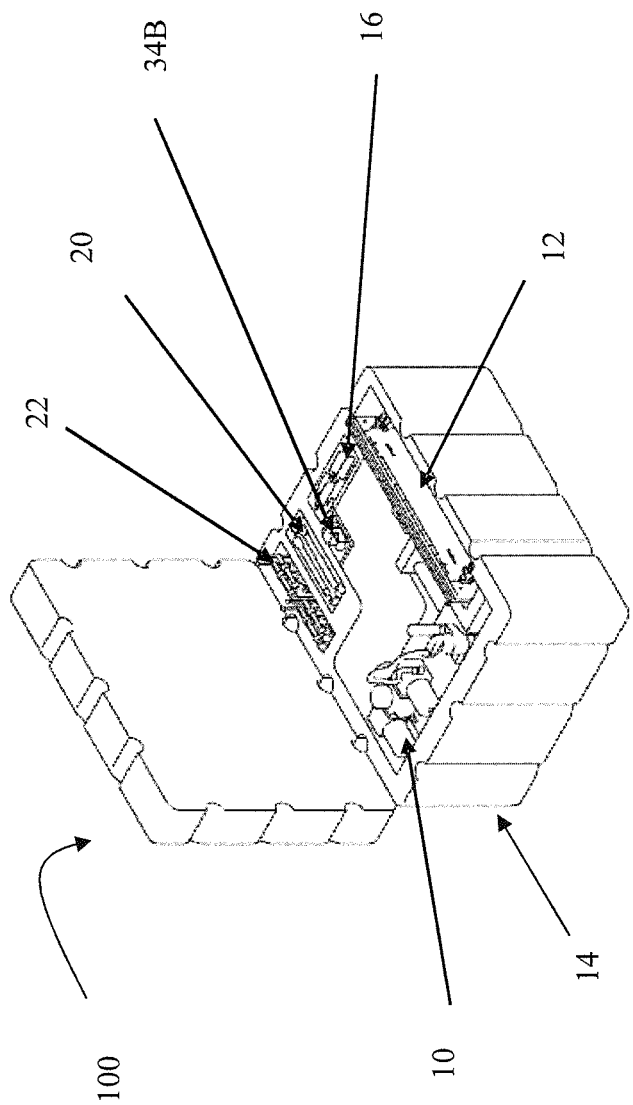
FIG. 1 is a perspective view illustrating the cutting tool assembly 10, 22, 20, 18, 16, and 12 housed 14 as a portable kit 100, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Aspects of the invention generally relate to portable cutting tool assembly apparatuses, methods, and kits for removed damaged areas from hard to access surfaces. An aspect of the invention relates to a cutting tool mechanism having at least one alignment cutting mechanism and at least one cutting mechanism, at least one portable cutting assembly configured to accommodate different cutting tool(s), and at least one fastening device associated with the portable cutting assembly or assemblies, and a surface for cutting, wherein the fastening device(s) secures the cutting tool to a desired location.

Another aspect of the invention generally relates to a method for removing areas of a surface including, providing a cutting tool mechanism which has at least one alignment blade and at least one saw blade, at least one portable cutting assembly configured to be associated with desired sized and shaped the blades, wherein the cutting assembly includes at least one frame, at least one shaft locking collar, at least one blade alignment mechanism, at least one blade positioning mechanism, at least one blade cutting controlling mechanism, at least one regulator assembly, at least one motor, and at least one power source, wherein the blade cutting controlling mechanism defines boundaries of the cutting area, at least one angle plate assembly adapted to be fastened to a surface, wherein the angle plate assembly configured to be associated with the portable cutting tool assembly, and at least one fastening device associated with the angle plate assembly, and a surface, wherein the fastening device secures the angle plate assembly to a desired location, positioning the angle plate assembly on a desired surface, fastening the angle plate assembly to the desired surface, installing the portable cutting tool assembly to the angle plate assembly, placing optionally a protective layer between the plate assembly and the desired surface, aligning said alignment blade with a desired cutting area, positioning a blade friction detecting device directly below the desired surface to be cut to establish one of the boundaries of the cutting area, setting the blade positioning mechanism to stop the saw blade from substantially touching the friction detecting device, installing and/or positioning the saw blade, providing a lubricant to the shaft locking collar, initiating the regulator assembly, setting and controlling the regulator assembly to set to a desired pressure, providing a lubricant to the saw blade, and cutting the desired surface.

Still yet another aspect of the invention generally relates to a portable cutting tool kit 100 for removing a desired area from a surface, the kit including at least one alignment cutting mechanism and at least one cutting tool mechanism 34B, at least one portable cutting assembly 10 configured to be associated with desired strengthened (lasers), sized and/or shaped cutting mechanisms, at least one angle plate assembly 12 adapted to be fastened to a surface, wherein the angle plate assembly configured to be associated with the portable cutting assembly, at least one fastening device associated with the portable cutting assembly, the angle plate assembly, and a surface, wherein the fastening device secures the angle plate assembly to a desired location, and wherein the kit is housed in a portable container 14, as shown in FIG. 1.

Yet still in another aspect, the invention generally relates to a cutting tool assembly including; at least one alignment laser mechanism and at least one cutting laser mechanism, at least one portable cutting assembly configured to be associated with different laser mechanisms, and at least one fastening device associated with the portable cutting tool assembly, and a surface, wherein the fastening device secures the cutting tool to a desired location.

These embodiments of the aspects of the invention include, but are not limited to, variations of the tool depending on its intended use and function. In some cases it is important that the non-damaged surface or other areas to be protected, whether it is the same surface being cut or any adjacent or nearby surface. In one example, a titanium plate was utilized as a cutting friction detecting device; however, many other technologies that are known in the art can be utilized to replace the titanium plate as a friction detecting device depending on the cutting mechanism used. The surface can be a damaged surface that needs to be removed from a desired location. The surface can be flat, substantially flat, or non-flat.

Figure 2:
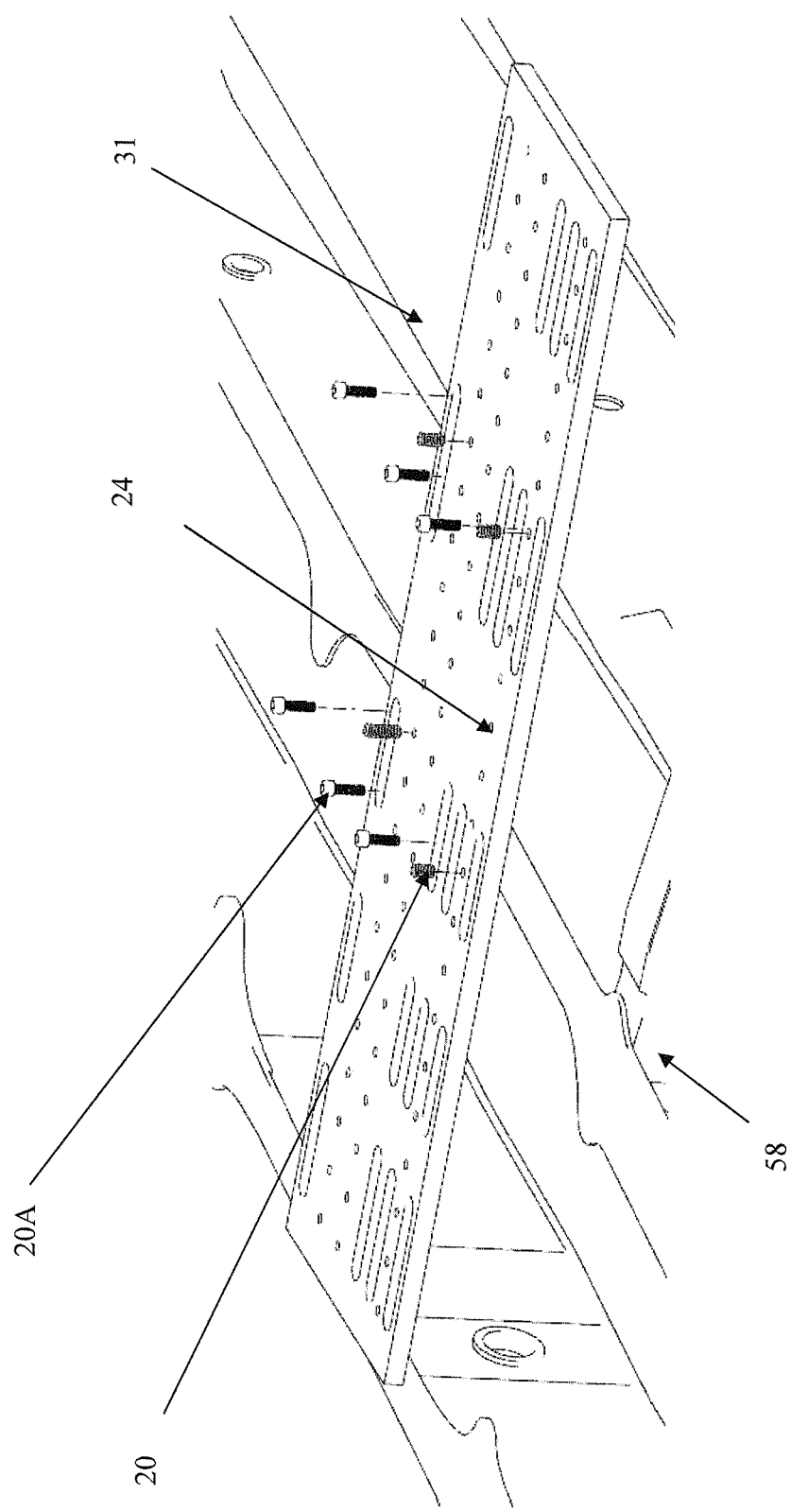
FIG. 2 is a perspective view illustrating a slotted bottom plate and a cross-sectional view of a wing spar where the slotted plate is to be mounted in such a fashion to allow the slots to align with the existing fastener holes on the spar, according to embodiments of the invention.
Figure 3:
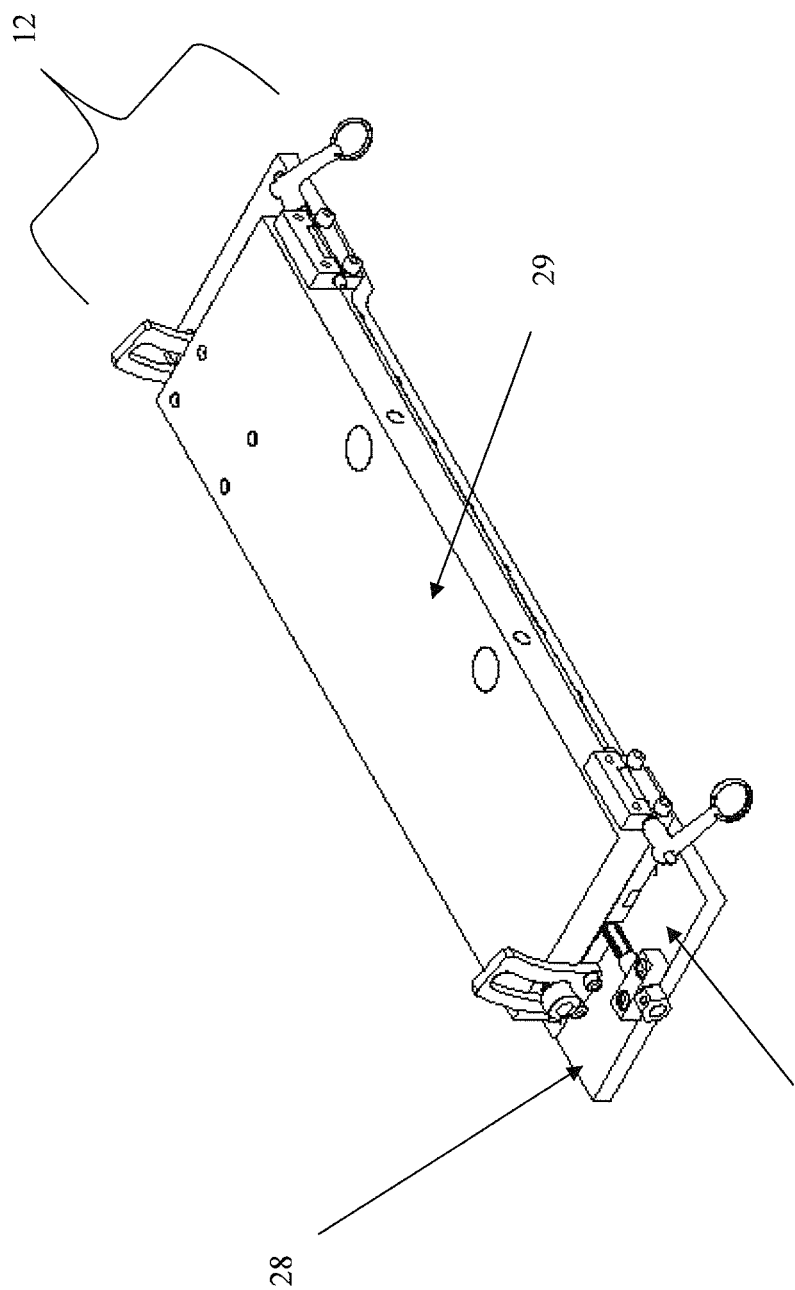
FIG. 3 is a perspective view illustrating the angle plate assembly 12 having a drive mechanism which is built into the bottom plate 31, according to embodiments of the invention.
Figure 4:
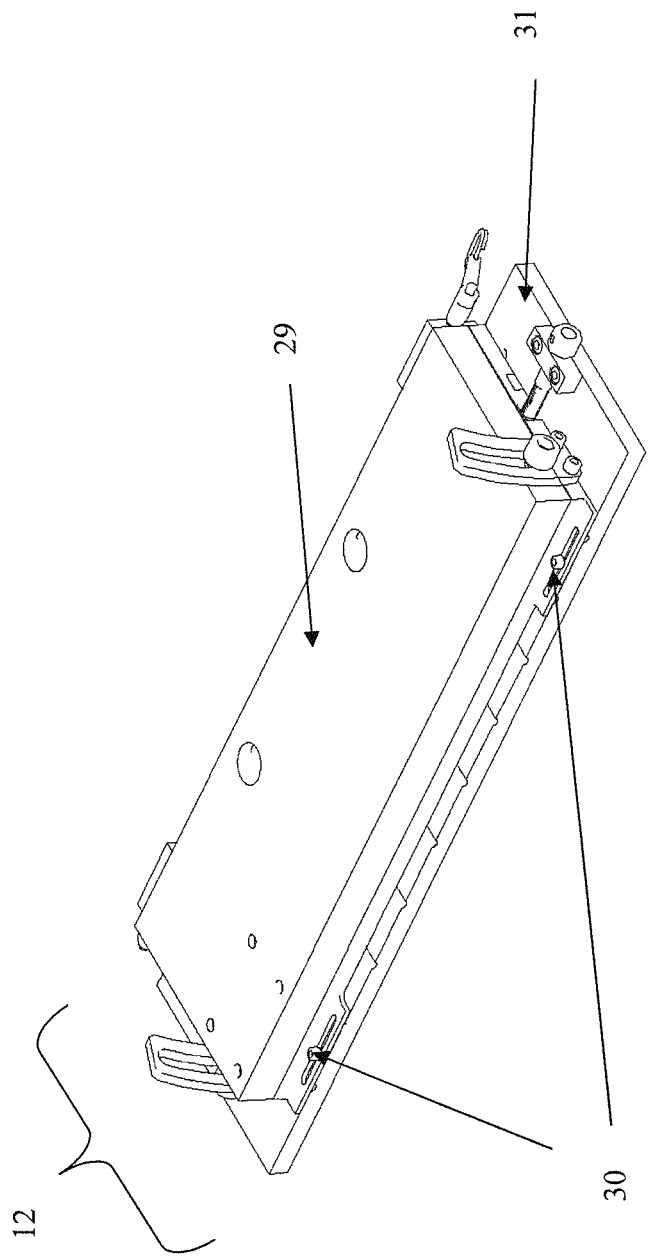
FIG. 4 is a perspective view illustrating the assembly plate having two locking socket head cap screws that will lock-in the angle plate assembly and prevent the plate from moving, according to embodiments of the invention.

In embodiments, the tool further includes at least one angle plate assembly adapted to be fastened to a surface, wherein the angle plate assembly is configured to be associated with the portable cutting assembly. FIG. 2 illustrates a slotted plate 24 to be mounted in such a fashion to allow the slots to align with the existing fastener holes on the wing spar 58. The socket head set 20A screws 20 (also shown in FIG. 1) are to be used to establish stability of the slotted plate. In embodiments, shielding, shims or protective layers are to be used when the slotted plate has contact with the spar. FIG. 3 shows the angle plate assembly 12 which has a drive mechanism 28 (points to position on bottom plate) built into the bottom plate 31. By turning the nut on the angle plate feed screw the bottom 31 and top plate 29 (=angle plate, a.k.a. top angle plate) can be moved in a linear direction depending on the requirements of the particular cut that is to be determined. (The main body of the spar cutter is removed in this view for clarity of the drive mechanism). FIG. 4 shows the angle plate assembly 12 having two locking socket head cap screws 30 that will lock-in the assembly plate and prevent the plate from moving. (The body of the cutting tool is not shown in this view for clarity.)

Figure 5:
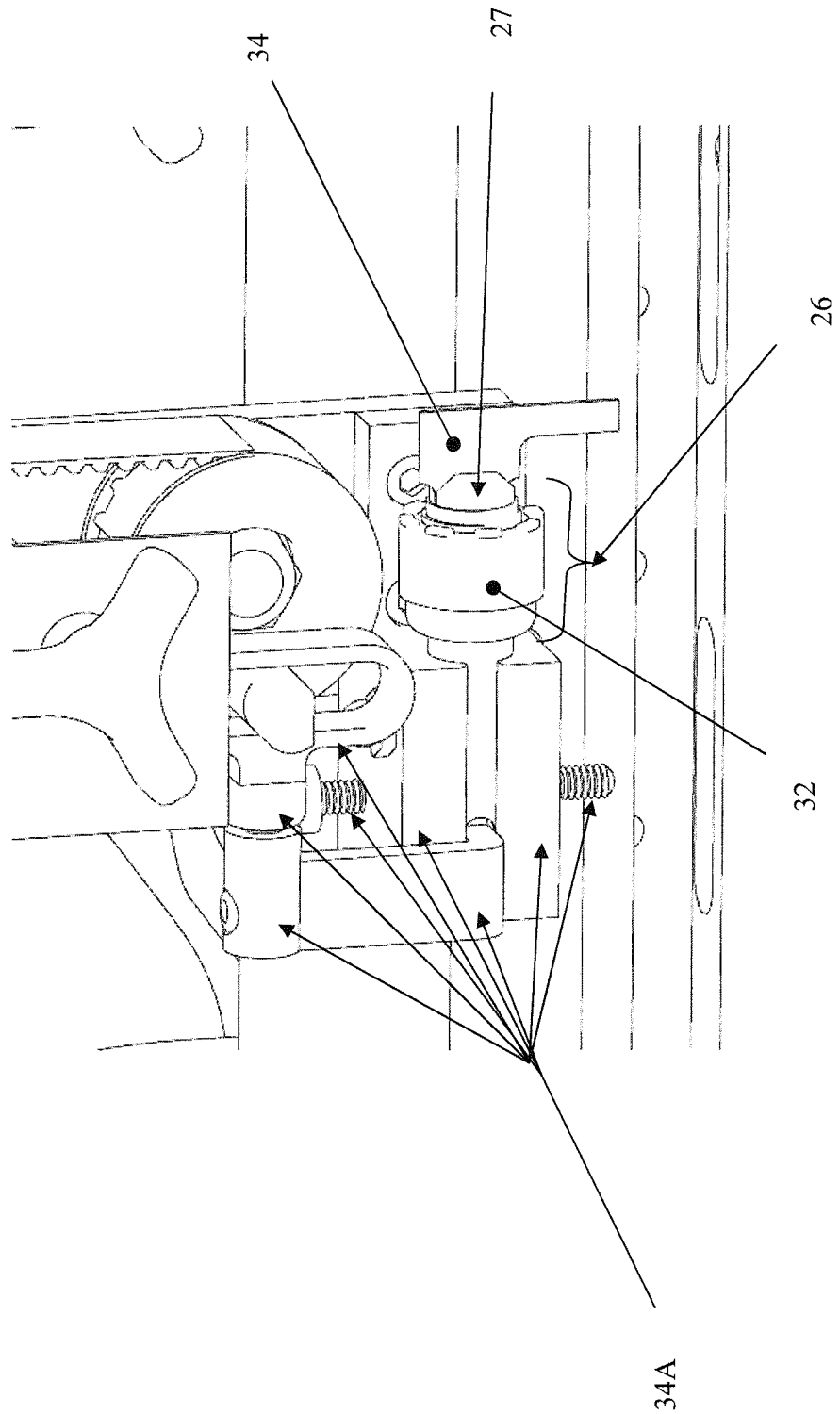
FIG. 5 is a perspective view illustrating the shaft locking collar which is to be rotated to release the blade or saw blade 34, according to embodiments of the invention.

When the cutting tool mechanism 34B in FIG. 5, is used to remove a damaged area of a wing spar, for example, the wing spar includes a slight curve to the spar and therefore has a substantially flat surface. The tool includes, but is not limited to, at least one cutting tool assembly having at least one frame, at least one shaft locking collar 32, at least one cutting alignment mechanism 34A, at least one cutting positioning mechanism 27, at least one cutting controlling mechanism, at least one regulator assembly, at least one motor, and at least one power source. As shown in FIG. 5, the shaft locking collar 32 and at least one position cutting mechanism 27 and at least one cutting controlling mechanism 26 is rotated to release the cutting tool blade or saw blade 34.

The power source can come from many technologies including, but not limited to, batteries, electrical plug (A/C, D/C), and solar. One skilled in the art would also be able to adapt the invention to include power sources from other sources as plug-ins from aircrafts, water and land vehicles, as some examples.

Figure 6:
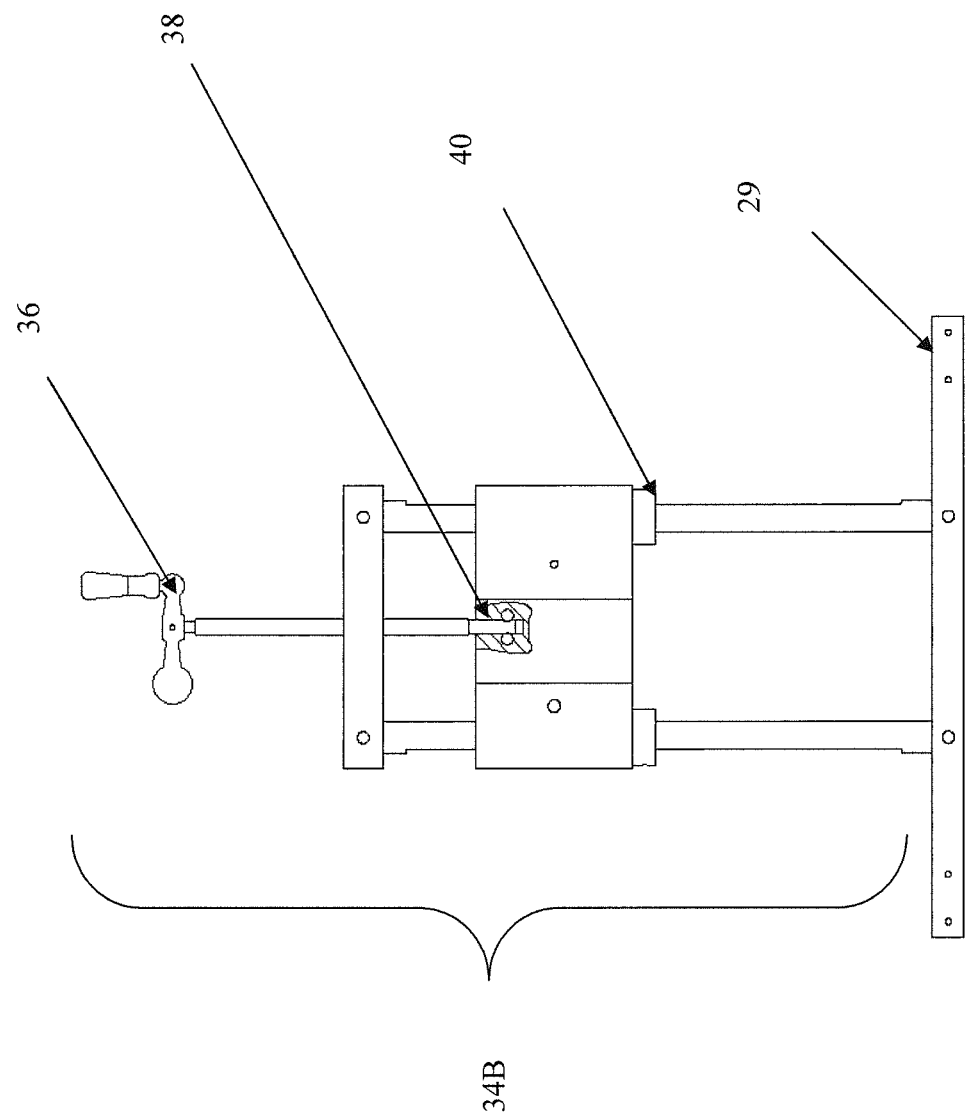
FIG. 6 is a perspective view illustrating the frame of the cutting tool assembly, according to embodiments of the invention.

The frame in one embodiment shown in FIG. 6 includes, but is not limited to, at least one plate, but can be made of any number of plates 29 to accommodate the components of the cutting tool mechanism 34B. In embodiments, the tool's frame/plate is associated with at least one shaft locking collar, at least one blade alignment mechanism, at least one blade positioning mechanism, at least one blade cutting controlling mechanism, at least one regulator assembly, at least one motor, and at least one power source. Embodiments including the blade alignment mechanism may have a shaft locking collar which is rotatably adjusted to receive, retain, and remove the alignment blade. The alignment cutting mechanism(s) and the cutting mechanism(s) can be a variety of cutting mechanisms known in the art in which embodiments of the invention could be utilized including, but not limited to, blades, saws, lasers, and high powered water streams.

In embodiments, the cutting tool mechanism includes a housing/frame constructed so that it slides on a pair of vertical rails. Each rail is pressed into a top plate and base plate with a roll pin pressed in through the top plate 29 and the base plate 31. Each rail has a set screwed mechanical lock that can be adjusted with the supplied Allen keys. The drive screw shaft is retained in place by two 5/16 roll pins that are pressed in the housing to capture the drive screw shaft. The drive screw 40 is threaded through a top plate 29. The drive screw shaft has a revolving handle 36 pined onto the drive screw shaft 38.

Figure 7:
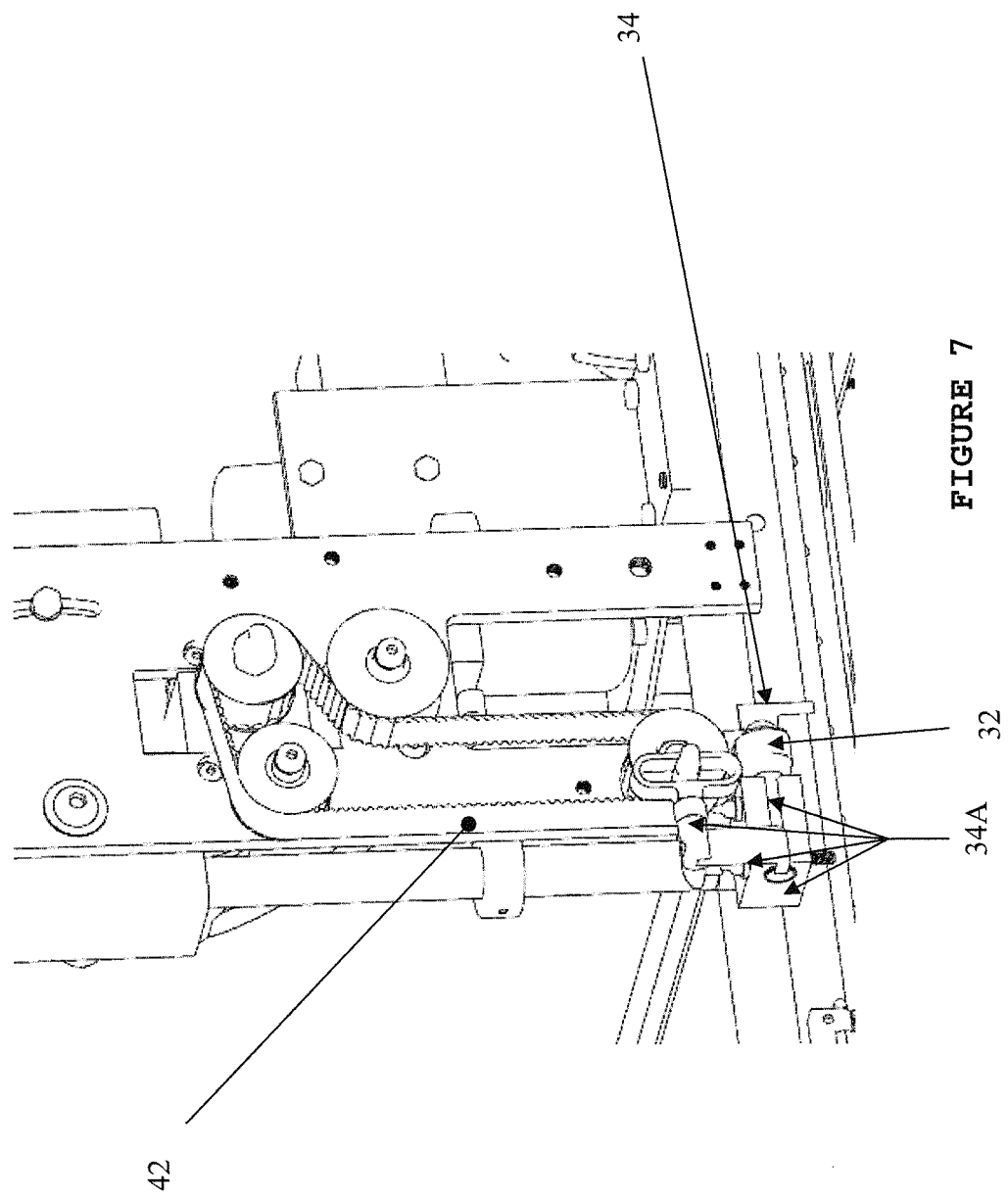
FIG. 7 is a perspective view illustrating the mechanics of the drive system and alignment cutting mechanism, according to embodiments of the invention.
Figure 8:
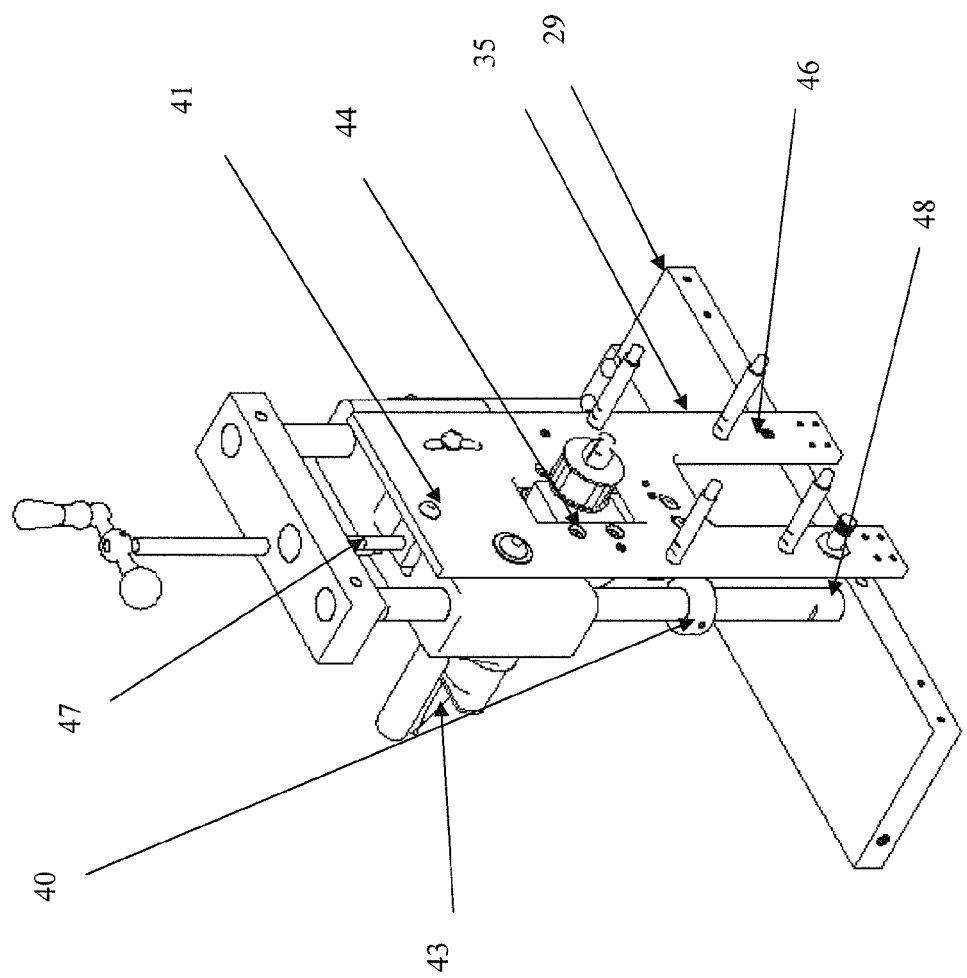
FIG. 8 is a perspective view illustrating the spar cutter without the complete drive belt assembly system in order to see some of the working parts associated thereon, according to embodiments of the invention.

The blade/cutting positioning mechanism in other embodiments include a drive belt assembly associated with the hand crank assembly which positions the alignment blade to a retractable position, an extended position, and to a desired location of a surface to adjust the saw blade to indicate a desired cut line. FIG. 7 illustrates embodiments for those having the mechanics of the drive system 42, and power source (electrical line 43 (shown in FIG. 8)) and blade friction detecting device 47 (shown in FIG. 8). The cover has been removed to view mechanics of the drive system. A cogged belt transfers the circular motion of the drive cog 44 (shown in FIG. 8) to lower cog where the motion is changed from circular to linear. The drawing further illustrates an embodiment including a scotch arm assembly 18 to change the motion to linear. FIG. 8 illustrates one embodiment showing the spar cutter frame plate 35 without the complete drive belt assembly system in order to see some of the working parts associated with this embodiment. The four studs 46 have been installed for the cover and the left side scotch arm 18 (shown in FIG. 1) axle 48 is in place. Visible are frame fasteners 41 that allow the cutter to swivel from side to side to allow precise cutting of the spar. Also the drawing illustrates the mechanical stops with set screws 40 and a top angle plate 29.

FIGS. 9 A & B illustrate the drive shaft assembly 28. The air motor drive shaft 50 is attached to the motor drive. The drive shaft goes through the air motor 33 adapter then through the drive block and out through the frame 35. The drive cog in this embodiment is driven by a 0.09 square key and is retained in place by a threaded nut.

In embodiments, the blade cutting controlling mechanism includes at least one hand crank assembly, at least one vertical stopping device and at least one set screw to define the boundaries of the cutting area. In most cases the blade(s) further needs a lubricant. When a hand crank assembly is used it lifts the saw blade away from the cutting area. When the alignment blade and the saw blade is utilized they can be configured to be interchangeable. One skilled in the art that the combination of hand crank and saw blade can be replaced with any mechanism that is known in the art to accomplish the desired result and is included within the scope of the invention.

Figure 10:
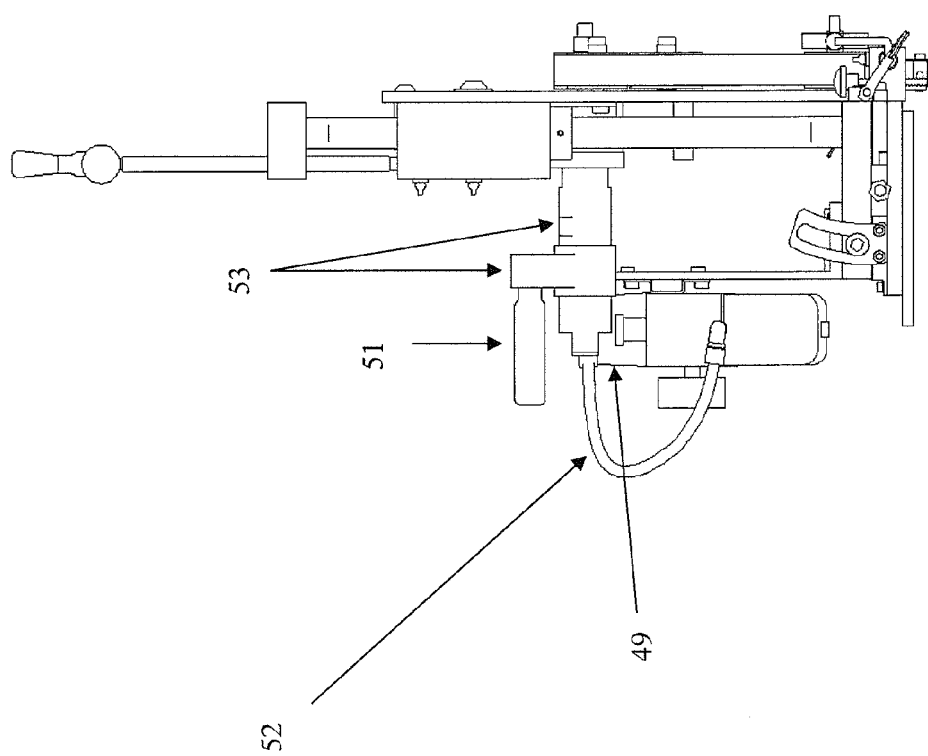
FIG. 10 is a perspective view illustrating an air hose which transfers the supplied air to the regulator, according to embodiments of the invention.

The cutting tool assembly may include at least one regulator assembly or like mechanism to control the cutting process. When a regular assembly is utilized it includes, but is not limited to, an air pressure regulator, a pressure indicator, and a pressure adjuster. The regulator assembly is configured to regulate, monitor, and set a desired pressure. The monitor can be analog or a digital gauge. When a regulatory assembly is utilized an air pressure regulatory assembly can be used. In embodiments, the regulator assembly can include an on/off mechanism or be automated. FIG. 10 illustrates an air hose 52 which transfers the supplied air to the regulator. The air motor 51 has a hose from the regulator to the air motor. The regulator 49 has a valve that allows the air pressure to be changed.

In embodiments using the cutting tool mechanism, the blade positioning mechanism may include a drive belt assembly associated with the hand crank assembly to position the alignment blade to a retractable position, an extended position, and to a desired location of a surface to adjust the saw blade to indicate a desired cut line. When a laser mechanism is utilized, the alignment laser mechanism and the cutting laser mechanism are configured to be interchangeable. Also, when the laser mechanism is utilized, the alignment laser and the cutting laser mechanism are integrated into a single laser. A calibrated high intensity laser will be used to cut through materials that have a high surface hardness.

Figure 11:
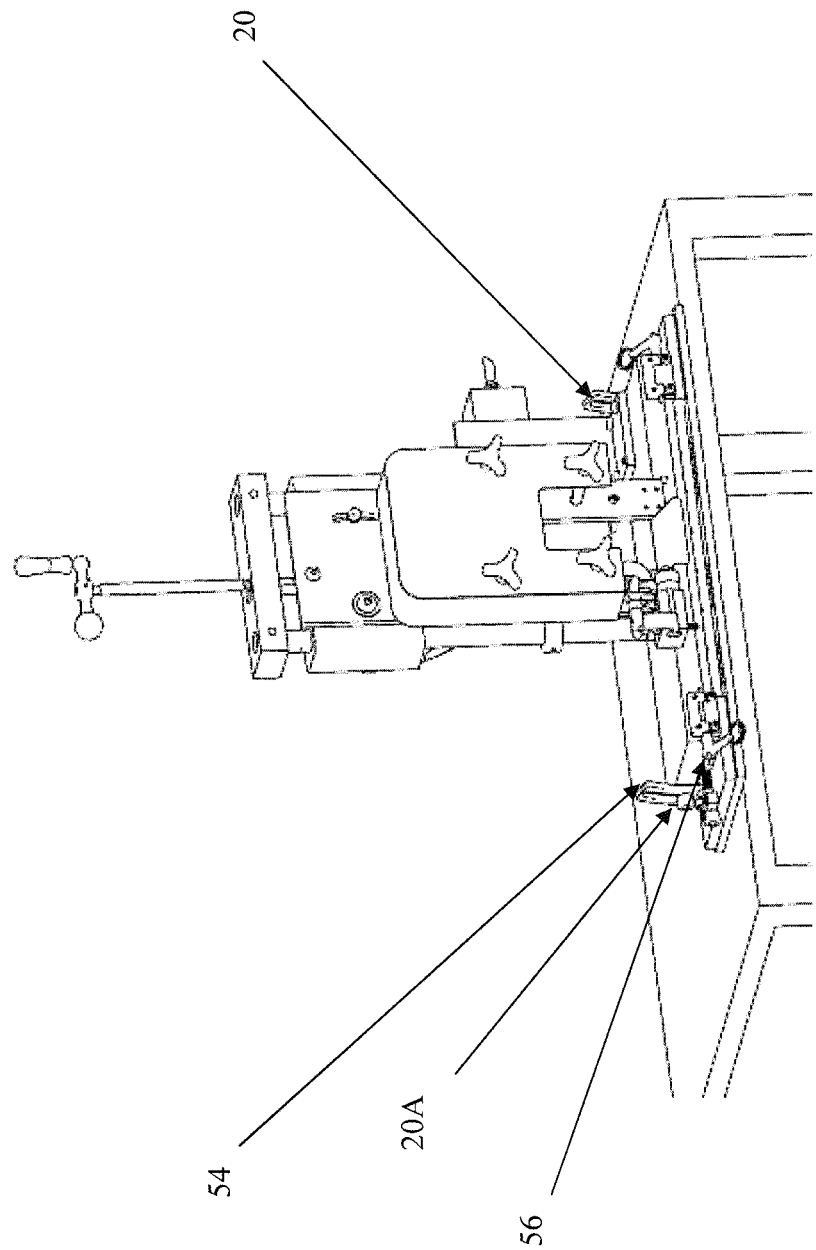
FIG. 11 is a perspective view illustrating a spar cutter when assembled, according to embodiments of the invention.

FIG. 11 illustrates an embodiment of the spar cutter when assembled. The tool positioning mechanism has the ability to change the angle to be cut. By using the lock pins 56 the cutter is allowed to pivot up to 20° from the horizontal position. There is a socket head set screw 20 that can be adjusted in or out to achieve a desired angle of the cut. The radius arms 54 have been constructed to allow for the angle of the cutter and to achieve a solid vibration free machine action when tightened. There are two large socket head cap screws 20A that are to be tightened when the angle of the tool has been achieved.

FIG. 1 illustrates the cutting tool assembly as a portable kit.

Table 1 is a sample of components included in an embodiment of the invention; however, the kit is not limited to this embodiment and depends on the functions, options, and variations of embodiments of the kit as to one skilled in the art.

TABLE 1

Component of the Kit.

Tools:

Allen wrench (assorted sizes)
Lubricants
Extreme Pressure Lube #3 (CAS #647-42-650)
Cutting fluid
Spar cutter
Right hand scotch arm
Left hand scotch arm
Angle plate assembly
Assorted welded saw blades
C-Clamps
3/8"-3/8 drive socket
3/8" × 6" extension
3/8" × 8" ratchet
7/8" modified socket
8" adjustable wrench Example of a Cutting Tool Kit Assembly and its Use The following examples are for illustration purposes only and not to be used to limit any of the embodiments nor its applications. This embodiment is useful for removing damaged areas from a wing spar. In this example, the angle plate assembly would be placed on a surface away from the inner wing. Lock pins and Allen bolts would be installed; however, any fastening device sufficient to secure the angle plate would suffice. The spar cutting tool mechanism is lowered onto the angle plate assembly and the locking pins are installed. The Allen bolts were threaded through the radius arm into the base plate. The slotted plate was placed on top of the spar(s), the set screws were used to level the slotted plate over the damaged spar in the location supplied by the aero engineer (AE). The socket head cap screws were used to tighten the slotted plate to the spars. (Note: It is an object not to scratch the phosphate finish on the inner wing) The spar cutter was lowered onto the slotted plate. The supplied c-clamps 22 (shown in FIG. 1) in the kit were used to fasten the spar cutter to the slotted plate; however, any fastening device sufficient to secure the spar cutter to the slotted plate will suffice. The shaft locking collar was twisted open and the alignment blade was installed. This will establish the exact path the saw blade will traverse in accordance with the AE.

It is to be understood that embodiments of the invention may also include variations including, but not limited to, exchangeable blades held by the same shaft locking collar mechanism, all blades integrated with the cutting tool assembly each blade having their own shaft locking collar mechanism, and all blades removably associated with the cutting assembly tools' shaft locking collar mechanism. It is also understood that each shaft locking collar is adapted to removably receive any desired shape or sized blade(s).

The artisan will move the drive belt up or down to position the alignment blade to its most retracted position. It is understood that any mechanism known in the art can be utilized to align the blades in embodiments of the invention. Once the saw shaft is in the most retracted position the hand crank can be turned (in this example, counterclockwise (CW)) to lower the saw shaft down to the web section of the spar. The drive belt is moved until the saw shaft is in the most extended position. The hand crank is turned to make the alignment blade traverse up and down the indicated cut-line and make adjustments to the saw as necessary. The c-clamps were tightened when the alignment blade followed the indicated cut line. The alignment arm was assembled to scribe the opposite side of the spar. It is also understood that the cutting tool alignment mechanism can be automated or operated manually.

For this example, a titanium sheet was utilized and laid down on the aircraft's carbon fiber inner skin. When using the hand crank, the alignment blade was traversed along the previously indicated area. When the alignment blade touches the titanium sheet there should be slight friction between the titanium sheet and the bottom of the alignment blade. The alignment arm will have scribed a line on the inside of the spar. At this time the set screw is lowered until it touches the titanium sheet with slight friction and the vertical stops are adjusted. The set screws should be loosened on the collar and the collar is slide up until it rests on the bottom of the frame. The set screws should then be tightened.

The saw is to be then raised to allow access to the twistable locking collar. The saw shaft is retracted so that it can be cranked up without touching the widest section of the spar. The locking collar is twisted open and the alignment blade removed. At this time the alignment arm should be unbolted. The locking collar should be twisted back open and the saw blade installed. The artisan will dab a generous portion of the supplied center lube to the exposed section of the saw shaft (if an equivalent lube is available it maybe applied through the zerk fitting). The saw shaft should be thoroughly lubricated. To start the saw, the air pressure regulator should be opened and the pressure set to 65-70 PSI. Once the saw has reached maximum speed, the saw is lowered by turning the hand crank CW. STOP before the blade contacts the spar. Dab a generous amount of cutting fluid on the saw blade and proceed to cut the spar by lowering the saw. When the saw nears the bottom of the spar the artisan will feel the hand crank bottom out and no further travel can be accomplished. At this time the titanium sheet should barely be scratched. The hand crank should be reversed to lift the saw blade away from the spar. When the cutting tool is clear of the damaged spar it can be moved to the next damaged section.

Changing the Scotch Arm Assembly

Figure 12:
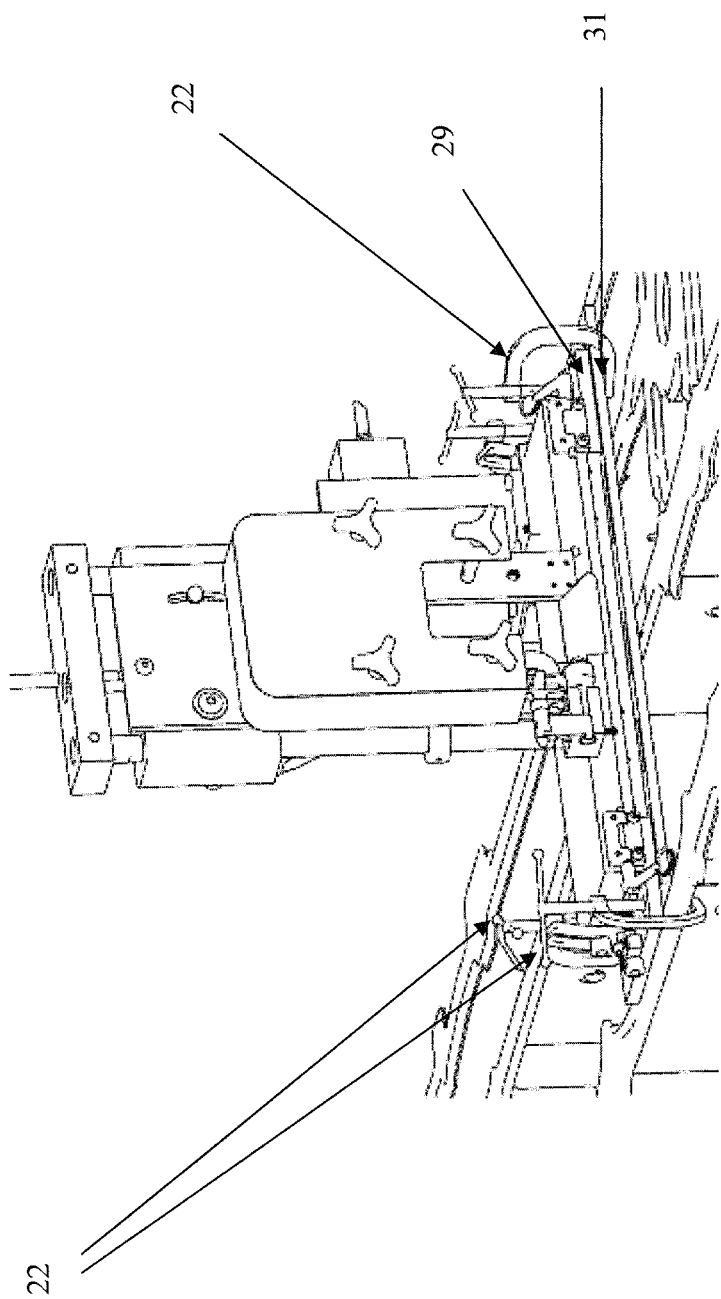
FIG. 12 is a perspective view illustrating the slotted plate installed on the A/C, according to embodiments of the invention.

In this embodiment, a Scotch arm assembly is utilized but any similar or like mechanism can be used to achieve a similar result and this example does not limit the scope of the invention. The C-clamps are to be used when the angle plate assembly is fastened to the A/C. There is a ⅜"-socket wrench, ⅜"×⅜ drive socket, a highly modified ⅞" ⅜ drive socket, a 6" extension and 8" adjustable wrench, and verity of Allen wrenches in this section of the cutouts. When the scotch arm assembly is not in use it is stored in here. There are also modified saw blades in this portable container. The angle plate assembly is located in a pocket constructed to store for transportation or when not in use. The cutting tool assembly is to be stored in this portable container. In one embodiment, a cut out of foam is used to allow easy entry and egress of the tool. FIG. 12 illustrates the slotted plate installed on the A/C. The slotted plate is installed on the A/C. The assembled tool will be placed on the slotted plate and positioned over the damaged area. The C-clamps 22 are used to attach the top angle plate assembly 29 and 31/tool to the slotted plate and to the A/C.

Twist the locking collar to remove the saw blade.
Use the 8" adjustable wrench to remove the scotch yoke axle.
Slide the scotch arm assembly out.
Use the correct Allen wrench to loosen the 4 socket head fasteners that hold the saw blade shaft guide to the frame.
Put the scotch arm assembly in the storage box and retrieve the opposite scotch arm assembly.
Use the 3/8" socket and the 6' extension and ratchet to turn the tension shaft to release tension on the drive belt Remove drive belt.
Use the 7/8" modified socket to remove the locking nut inoido the recess on the lower dnve cog.
Use the 8" adjustable wrench to remove the lower cog axle and to install the lower drive axle on the opposite side of the frame.
Slide the lower cog on the lower cog axle and tighten the 7/8" nut with the modified 7/8 socket.
Use the supplied Allen wrench to remove the fixed cog and re-installing in on the opposite side of the frame.
Use the supplied Allen wrench and unbolt and move the idler over the appropriate location
Replace the drive belt and use the 3/8' socket and the 6" extension with the ratchet to apply tension to the drive belt Assure the drive belt shall move freely but not slide on the drive cogs.
Place the blade shaft guide on the frame and install the 4 socket head fasteners until all are tight.
Slide the scotch arm assembfy in the saw blade shaft guide.
Install the scotch yoke axle with the 8" adjustable wrench.
The saw is ready to be positioned for the next operation.

Wing Spar

Figure 13:
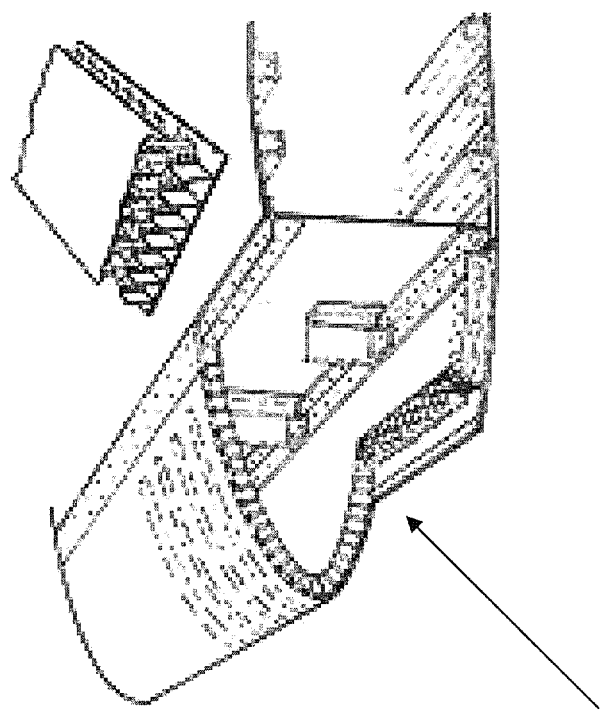
FIG. 13 is perspective and cross sectional views illustrating the construction of the leading edge of a wing spar, according to embodiments of the invention.

Although the cutting tool is intended for a variety of uses and functions, the embodiments of the invention are not limited to wing spars and the following is an example of the inventions' use. In a fixed-wing aircraft as shown in FIG. 13, the wing spar 58 is often the main structural member of the wing, running span-wise at right angles (or thereabouts depending on wing sweep) to the fuselage. The spar carries flight loads and the weight of the wings whilst on the ground. Other structural and forming members including ribs may be attached to the spar or spars, with stressed skin construction also sharing the loads where it is used. There may be more than one spar in a wing or none at all; however, where a single spar carries the majority of the forces on it, it is known as the main spar.

Spars are also used in other aircraft aerofoil surfaces including the tailplane and fin which serve a similar function although the loads transmitted may be different to those of a wing spar.

Forces on a Wing Spar

Some of the forces acting on a wing spar include:

Upward bending loads resulting from the wing lift force that supports the fuselage in flight. These forces change in relation to the mass of the aircraft and acceleration due to gravity, and are often offset by carrying fuel in the wings or employing wing-tip-mounted fuel tanks; the Cessna 310 is an example of this design feature.

Downward bending loads whilst stationary on the ground due to the weight of the structure, fuel carried in the wings, and wing-mounted engines if used.

Drag loads dependent on airspeed and inertia.

Rolling inertia loads.

Chordwise twisting loads due to aerodynamic effects at high airspeeds often associated with washout, and the use of ailerons resulting in control reversal. Further twisting loads are induced by changes of thrust settings to underwing-mounted engines.

Many of these loads are reversed abruptly in flight with an aircraft such as the Extra 300 when performing extreme aerobatic maneuvers; the spars of these aircraft are designed to safely withstand great load factors.

Materials and Construction

Some spars have a wooden construction. Early aircraft used spars often carved from solid Spruce or Ash. Several different wooden spar types have been used and experimented with for example spars which are either box-section in form; or laminated spars which are laid up in a jig, and compression glued to retain the wing dihedral. Wooden spars are still being used in light aircraft. A disadvantage of the wooden spar is the deteriorating effect that atmospheric conditions, both dry and wet, and biological threats such as wood-boring insect infestation and fungal attack can have on the component; consequently regular inspections are often mandated to maintain airworthiness. Wood wing spars of multipiece construction usually consist of upper and lower members, called spar caps, and vertical sheet wood members, known as shear webs or more simply webs, that span the distance between the spar caps. Some spars are constructed of metal or metal alloys. FIG. 2 illustrates a metal spar construct.

Basic Metal-Sparred Wing

A typical spar in a general aviation aircraft usually includes a sheet of aluminum known as the spar web, with "L" or "T"-shaped strips known as spar caps welded or riveted to the top and bottom of the sheet to prevent buckling under loads when applied. Larger aircraft using this method of spar construction may have the spar caps sealed to provide integral fuel tanks. Fatigue of metal wing spars has been an identified causal factor in aviation accidents, especially in older aircraft.

A design aspect of the Supermarine Spitfire wing that contributed greatly to its success was an innovative spar boom design, made up of five square concentric tubes which fitted into each other. Two of these booms were linked together by an alloy web, creating a lightweight and very strong main spar. The undercarriage legs were attached to pivot points built into the inner, rear of the main spar and retracted outwards and slightly backwards into wells in the non load-carrying wing structure. The narrow undercarriage track of this aircraft was considered to be an acceptable compromise as it allowed the landing impact loads to be transmitted to the strongest parts of the wing structure.

A version of this spar construction method is also used in the BD-5 which was primarily an aluminum tube of approximately 2 inches (5.1 cm) in diameter, and joined at the wing root with a much larger internal diameter aluminum tube to provide the wing structural integrity.

Geodesic Construction

In aircraft such as the Vickers Wellington, a geodesic wing spar structure was employed which had the advantages of being lightweight and able to withstand heavy battle damage with only partial loss of strength.

Composite Construction

Many modern aircraft use carbon fiber and Kevlar® in their construction, ranging in size from large airliners to small homebuilt aircraft. The increase in strength and reduction in weight compared to the earlier fiberglass-sparred aircraft allows a greater quantity of water ballast to be carried.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A portable cutting tool assembly, comprising:
    at least one cutting mechanism including at least one cutting tool, at least one frame, at least one shaft locking collar, at least one alignment cutting mechanism, a regulator assembly, and an air motor;
    at least one angle plate assembly having a bottom plate and a top plate;
    wherein said at least one cutting mechanism is configured to accommodate different said cutting tools;
    said at least one angle plate assembly adapted to be fastened to a desired surface on an aircraft wing, wherein said angle plate assembly is configured to be associated with said at least one cutting mechanism, wherein said at least one cutting mechanism comprises of a drive belt assembly, associated with a hand crank assembly to position an alignment cutting mechanism to a retractable position, an extended position, and to a desired location of said surface to adjust a cutting tool to indicate a desired cut line, wherein said drive belt, assembly is movable in a linear direction depending on the requirements of a desired cut, wherein said angle plate assembly having at least one locking mechanisms that will lock-in said angle plate assembly in place on said surface and prevent said angle plate assembly from moving; and
    at least one fastening device associated with said angle plate assembly to secure at said surface, wherein said at least one cutting tool cuts a desired shape cut-out from a portion of said aircraft wing.

2. The tool assembly according to claim 1, further comprising a power source.

3. The tool assembly according to claim 1, wherein said shaft locking collar being rotatably adjusted to receive, retain, and remove said cutting tool.

4. The tool assembly according to claim 1, wherein said hand crank assembly, at least one vertical stopping device and at least one set screw to define the boundaries of a cutting area.

5. The tool assembly according to claim 1, wherein said regulator assembly comprises of an air pressure regulator, a pressure indicator, and a pressure adjuster.

6. The tool assembly according to claim 1, wherein said regulator assembly is configured to regulate, monitor, and set a desired pressure.

7. The tool assembly according to claim 1, wherein said regulatory assembly is an air pressure regulatory assembly.

8. The tool assembly according to claim 1, wherein said regulator assembly comprises an on/off mechanism.

* * * * *